(12) United States Patent
Chen

(10) Patent No.: US 11,159,663 B2
(45) Date of Patent: Oct. 26, 2021

(54) DIGITAL PRODUCT FIXING DEVICE

(71) Applicant: Shenzhen Sincetop Technology Co., Ltd., Shenzhen (CN)

(72) Inventor: Qi Chen, Shenzhen (CN)

( * ) Notice: Subject to any disclaimer, the term of this patent is extended or adjusted under 35 U.S.C. 154(b) by 0 days.

(21) Appl. No.: 17/260,450

(22) PCT Filed: Sep. 3, 2019

(86) PCT No.: PCT/CN2019/104223
§ 371 (c)(1),
(2) Date: Jan. 14, 2021

(87) PCT Pub. No.: WO2021/035777
PCT Pub. Date: Mar. 4, 2021

(65) Prior Publication Data
US 2021/0250435 A1   Aug. 12, 2021

(30) Foreign Application Priority Data

Aug. 23, 2019   (CN) .......................... 201921399337.9

(51) Int. Cl.
*H04M 1/04* (2006.01)
*A45F 5/02* (2006.01)
(Continued)

(52) U.S. Cl.
CPC .............. *H04M 1/04* (2013.01); *A45F 5/021* (2013.01); *H04B 1/3888* (2013.01);
(Continued)

(58) Field of Classification Search
CPC ........ A45F 2200/0516; A45F 2005/008; A45F 2005/025; H04B 1/3888; H04M 1/04
See application file for complete search history.

(56) References Cited

U.S. PATENT DOCUMENTS 8,638,557 B2 * 1/2014 Tsai ...................... H04M 1/04
361/679.56
8,827,127 B2 * 9/2014 Rekuc ...................... A45F 5/02
224/183
(Continued)

FOREIGN PATENT DOCUMENTS

CN         105227720 A      1/2016
CN         206195862 U      5/2017
(Continued)

OTHER PUBLICATIONS

International Search Report and Writen Opinion of PCT/CN2019/104223 dated May 15, 2020.

*Primary Examiner* — Bradley Duckworth
(74) *Attorney, Agent, or Firm* — W&K IP

(57) ABSTRACT

A digital product fixing device includes: a mobile phone patch, a shell, a rotating wheel, a buckle, and a buckle spring, wherein, the rotating wheel is pivotally provided in the mounting cavity of the shell, the buckle is retractably provided along the radial of the rotating wheel through the buckle spring, a cam is protruded and provided on the bottom surface of the mounting cavity of the shell; one end of the mobile phone patch is inserted into the buckle cavity of the rotating wheel, the cam makes the buckle spring drive the buckle spring inward to buckle the mobile phone patch when the rotating wheel turns into a first angle range. The disclosure can be easily installed and disassembled the mobile phone with one hand.

5 Claims, 13 Drawing Sheets

(51) Int. Cl.
*H04B 1/3888* (2015.01)
*B62J 50/21* (2020.01)
*A45F 5/00* (2006.01)

(52) U.S. Cl.
CPC ... *A45F 2005/008* (2013.01); *A45F 2005/025* (2013.01); *A45F 2200/0516* (2013.01); *B62J 50/225* (2020.02)

(56) References Cited

U.S. PATENT DOCUMENTS

| | | | |
|---|---|---|---|
| 9,185,953 B2* | 11/2015 | Whitten | A45C 11/00 |
| 9,611,881 B2* | 4/2017 | Khodapanah | F16M 11/041 |
| 10,554,238 B2* | 2/2020 | Qi | H05K 5/0204 |
| 10,568,410 B2* | 2/2020 | Pierson | H04M 1/04 |
| 10,631,621 B2* | 4/2020 | Gregory | A45F 5/021 |
| 10,760,732 B1* | 9/2020 | Koh | H04B 1/3888 |
| 2012/0037673 A1 | 2/2012 | Chen | |
| 2020/0069002 A1* | 3/2020 | Fiedler | A61F 5/01 |
| 2020/0138174 A1 | 5/2020 | Qi | |
| 2020/0145522 A1* | 5/2020 | Liu | G08B 7/06 |

FOREIGN PATENT DOCUMENTS

| | | |
|---|---|---|
| CN | 206564619 U | 10/2017 |
| CN | 208750329 U | 4/2019 |
| CN | 208905047 U | 5/2019 |
| DE | 202018004964 U1 | 5/2019 |

* cited by examiner

DIGITAL PRODUCT FIXING DEVICE

CROSS REFERENCE TO RELATED APPLICATIONS

This application is a 371 of International Patent Application No. PCT/CN2019/104223 with a filing date of Sep. 3, 2019, designating the United States, and further claims priority to Chinese Patent Application No. 201921399337.9, filed on Aug. 23, 2019, the entire content of which is incorporated herein by reference.

TECHNICAL FIELD OF THE INVENTION

The disclosure relates to the field of mobile phone accessories, in particular, relates to a digital product fixing device.

BACKGROUND OF THE INVENTION

When playing sports, an arm bag product in the prior art needs to put a phone into a transparent bag. The bottom of the bag is open, the headset is plugged in, and the sound is output through the headset. If you want to make a phone call, you need to remove the headset and take out the phone from the bag before using it, so it is extremely inconvenient. For example, when riding navigation, a phone holder in the prior art needs to put the mobile phone into a transparent bag, because there is no opening in the bag, so the sound is very small. If you want to make a phone call, the cell phone sound is very small and cannot reasonably come out from the bag, so it is extremely inconvenient. In addition, a phone clips in the prior art is inconvenient to install the mobile phone, unstable to buckle, and inconvenient to access by one-handed, and so on.

SUMMARY OF THE INVENTION

The purpose of the disclosure is to provide a digital product fixing device, which is intended to solve the problems raised in the background of the invention.

The embodiment of the disclosure is implemented in this way, a digital product fixing device includes a mobile phone patch, a shell, a rotating wheel, a buckle, and a buckle spring, wherein, the rotating wheel is pivotally provided in the mounting cavity of the shell, the buckle is retractably provided along the radial of the rotating wheel through the buckle spring, a cam is protruded and provided on the bottom surface of the mounting cavity of the shell; one end of the mobile phone patch is inserted into the buckle cavity of the rotating wheel, the cam makes the buckle spring drive the buckle spring inward to buckle the mobile phone patch when the rotating wheel turns into a first angle range, and pushes the buckle outward so as to unlock the clamping between the buckle and the mobile phone patch when the rotating wheel turns into a second angle range.

Further, the digital product fixing device further includes a rotating return spring, an end of the rotating return spring is connected with the shell, and another end of the rotating return spring is connected with the rotating wheel.

Further, the first angle range is 0-70 degrees, and the second angle range is 80-90 degrees.

Further, the digital product fixing device further includes a locking wrench, a locking groove matching with the locking wrench is provided on the rotating wheel, the locking wrench is pivotably connected with the shell.

Further, the bottom of the shell is provided with a mounting screw hole.

Further, the shell is provided with a mounting groove for inserting the locking wrench, the locking wrench is provided with a rotating centre shaft and a limit shaft, and the middle of the mounting groove is provided with a guide groove for passing the limit shaft.

As a result of the adoption of the above-mentioned technical solution, the disclosure can be easily installed and disassembled the mobile phone with one hand, and solve the problem of the trouble of installing the mobile phone, unstable buckles, and inconvenient removal with one hand. The rotation of this disclosure is also the process of disassembling the mobile phone, so as to avoid that the products in the prior art need to press at first and then operate with two hands.

DETAILED DESCRIPTION OF THE EMBODIMENTS

Figure 1:
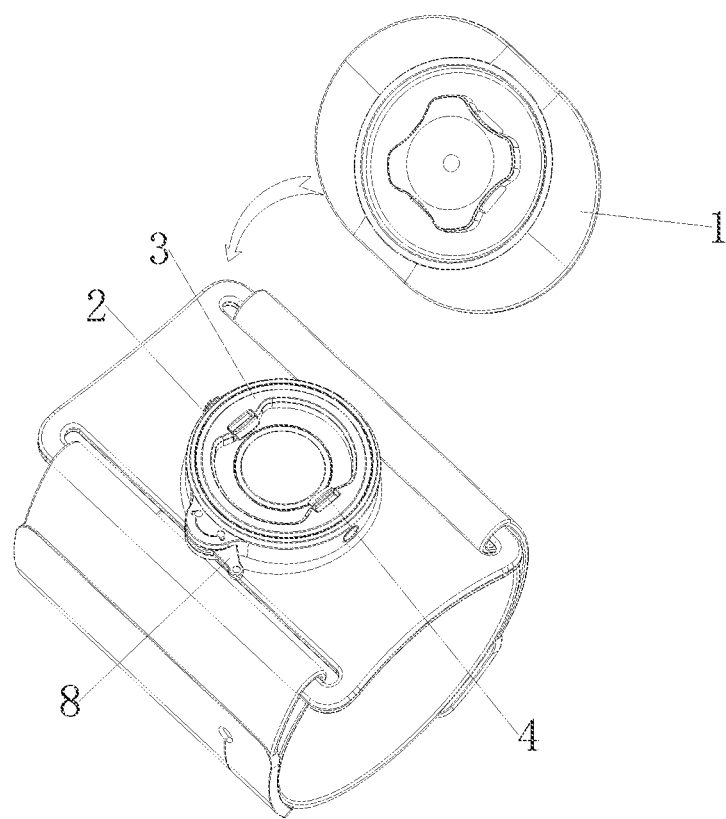
FIG. 1 shows a diagram of the use process of the disclosure.
Figure 2:
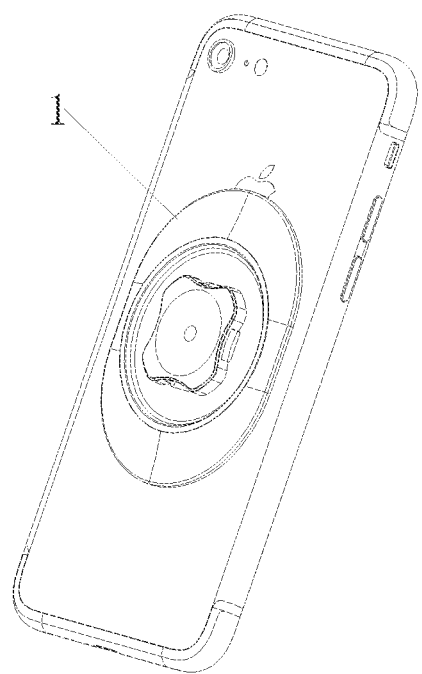
FIG. 2 shows the connection diagram between the mobile phone patch and the mobile phone.

In order to make the purpose, technical solution and advantages of the disclosure more clearly, the disclosure, combined with drawings and embodiments, will be further detailed. It should be understood that the specific embodiments described herein are intended only to explain the disclosure and are not intended to qualify the disclosure.

In addition, in the description of the application, the terminology used should be understood in a broad sense, and for the technical staff in the field, the specific meaning of the term may be understood in the context of the actual circumstances. For example, the terms "provide" and "arrange" used in this application may be defined as contact settings or contactless settings, etc., and the azimuth terms used are based on reference sits or in the direction defined by the actual situation and common sense.

An aspect of the disclosure, it provides a digital product fixing device includes: a mobile phone patch 1, a shell 2, a rotating wheel 3, a buckle 4, and a buckle spring 5, the rotating wheel 3 is pivotally provided in the mounting cavity of the shell 2, the buckle 4 is retractably provided along the radial of the rotating wheel 3 through the buckle spring 5, a cam 6 is protruded and provided on the bottom surface of the mounting cavity of the shell 2. One end of the mobile phone patch 1 is inserted into the buckle cavity of the rotating wheel 3, the cam 6 makes the buckle spring 5 drive the buckle spring 4 inward to buckle the mobile phone patch 1 when the rotating wheel 3 turns into a first angle range, and pushes the buckle 4 outward so as to unlock the clamping between the buckle 4 and the mobile phone patch 1 when the rotating wheel 3 turns into a second angle range.

Figure 3A:
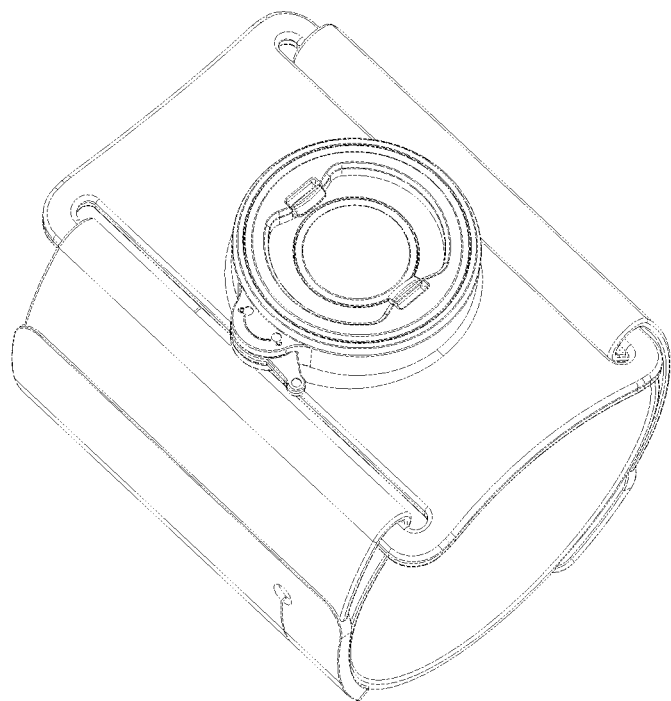
FIG. 3a shows the diagram of the disclosure set in an arm clip.
Figure 3B:
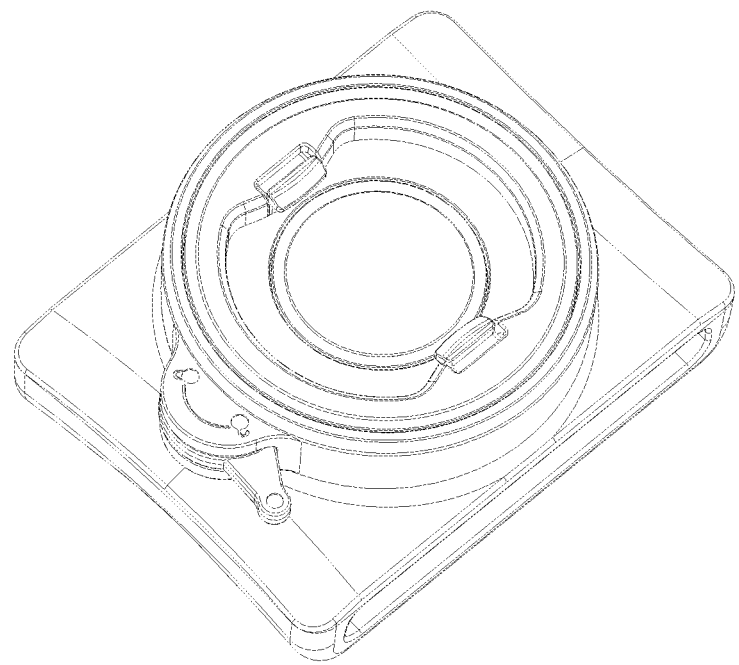
FIG. 3b shows the diagram of the disclosure set in the belt clip.
Figure 3C:
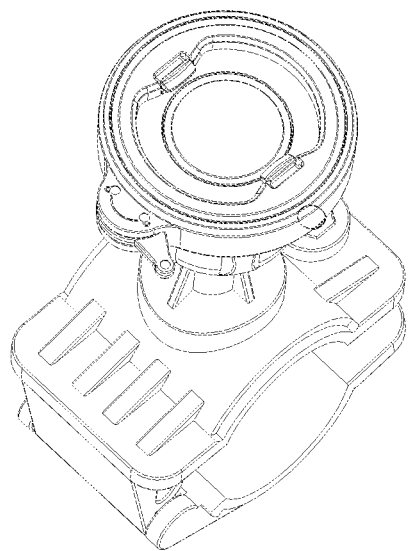
FIG. 3c shows the diagram of the disclosure set in the bicycle clip.
Figure 4:
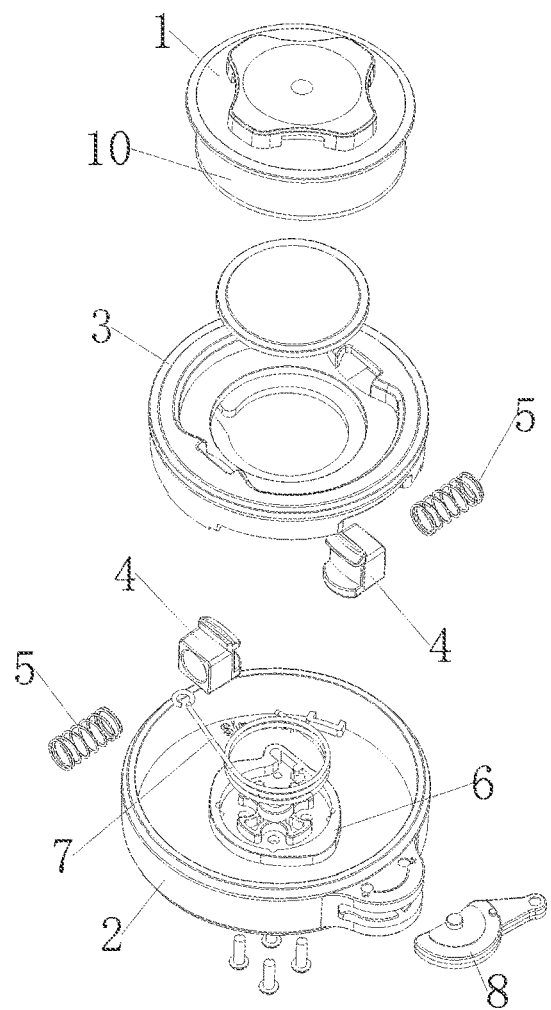
FIG. 4 shows the explosive diagram of the disclosure
Figure 5:
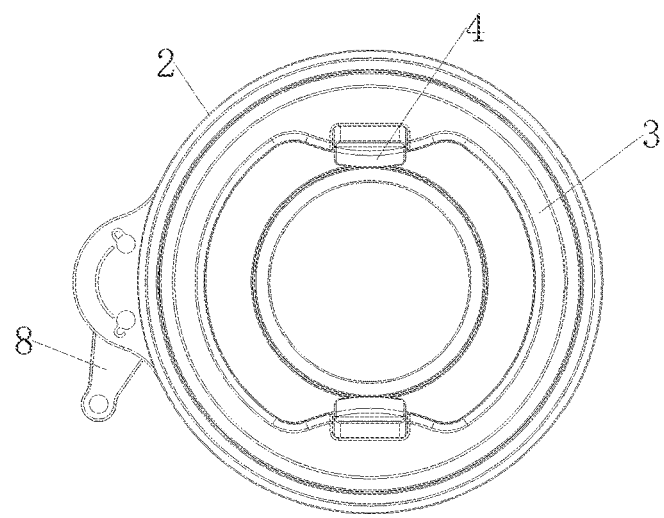
FIG. 5 shows the top view of the disclosure
Figure 6:
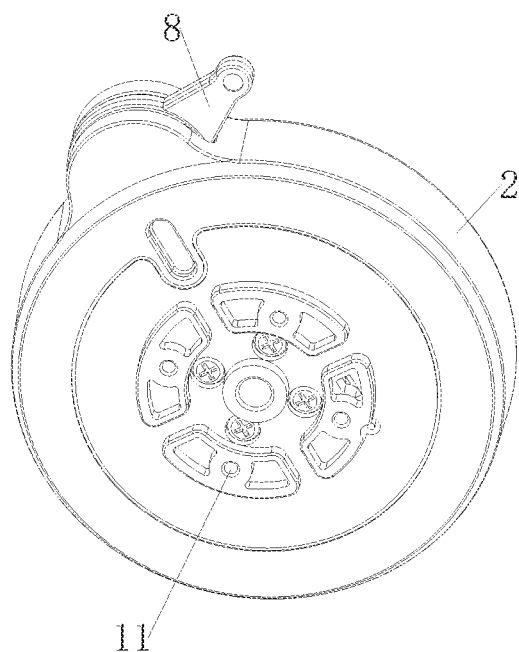
FIG. 6 shows the bottom diagram of the shell.
Figure 7:
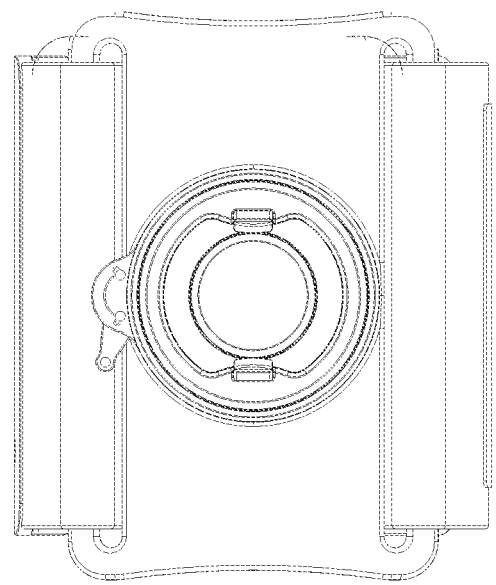
FIG. 7 shows a diagram of the closed state.
Figure 8:
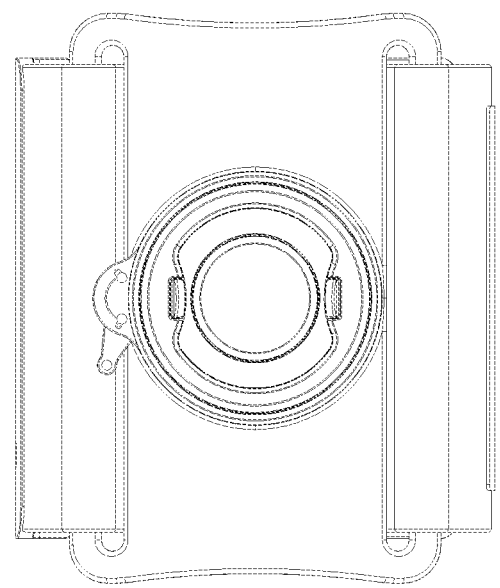
FIG. 8 shows a diagram of the open state.
Figure 9:
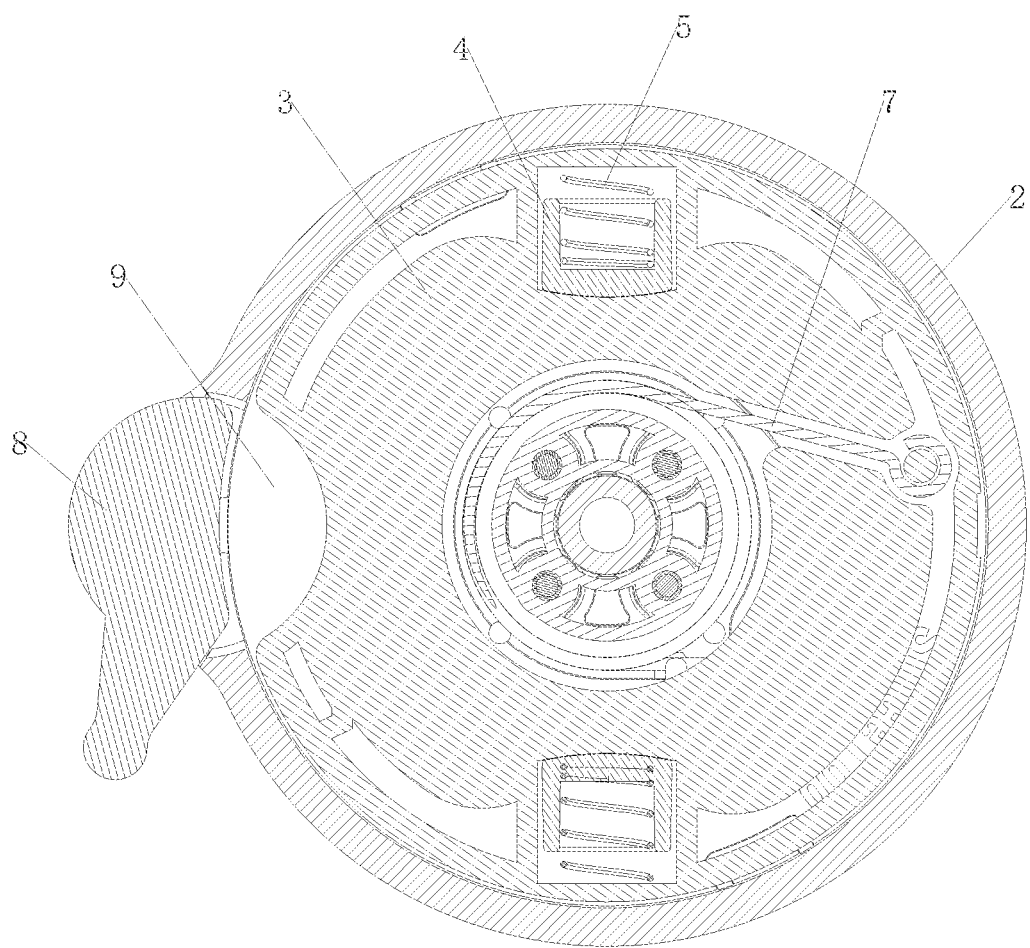
FIG. 9 shows an illustration of the locking wrench being unlocked.
Figure 10:
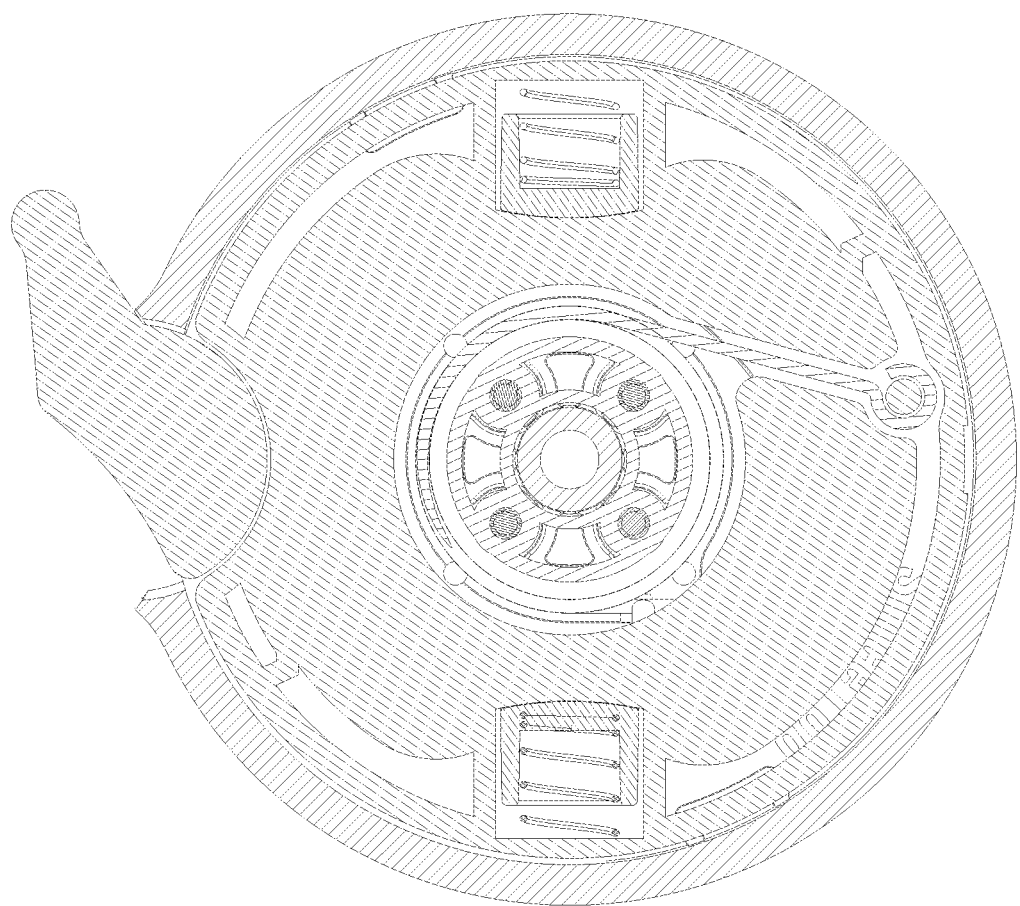
FIG. 10 shows the diagram of the locking wrench being locked.
Figure 11:
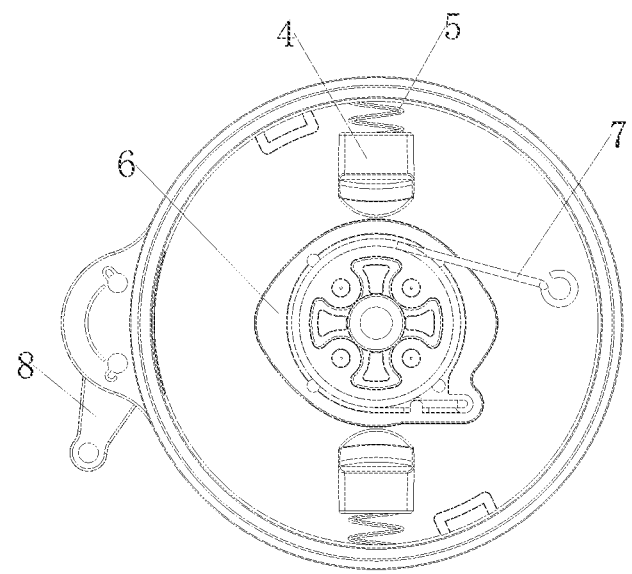
FIG. 11 shows the diagram of the cam in a closed state.
Figure 12:
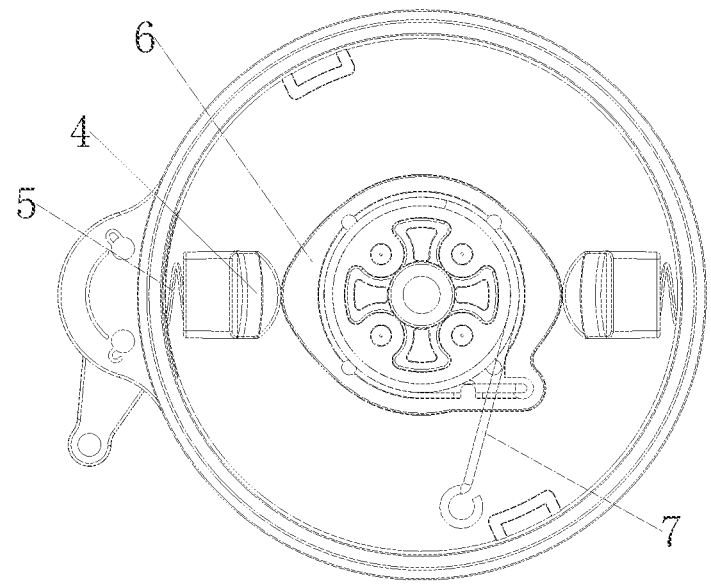
FIG. 12 shows a diagram of the cam in an open state.
Figure 13:
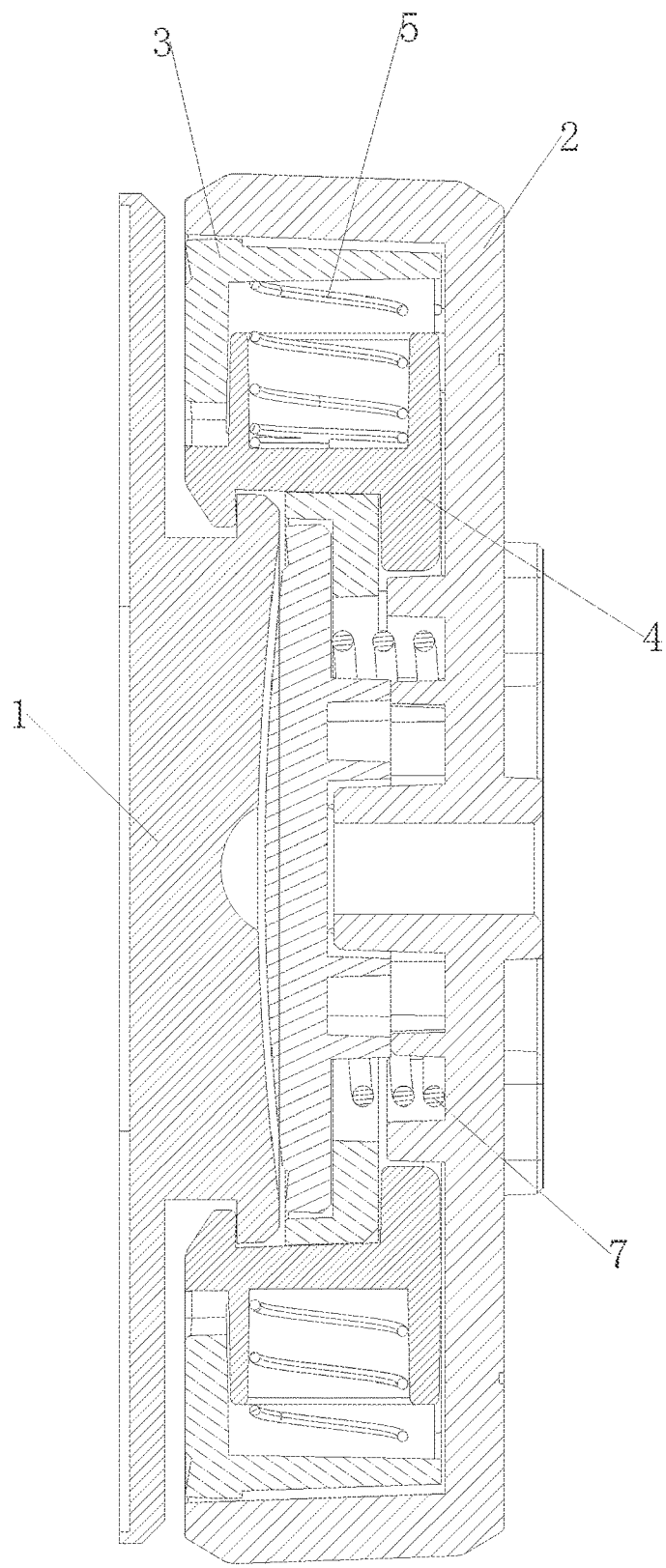
FIG. 13 shows a diagram of the close state.
Figure 14:
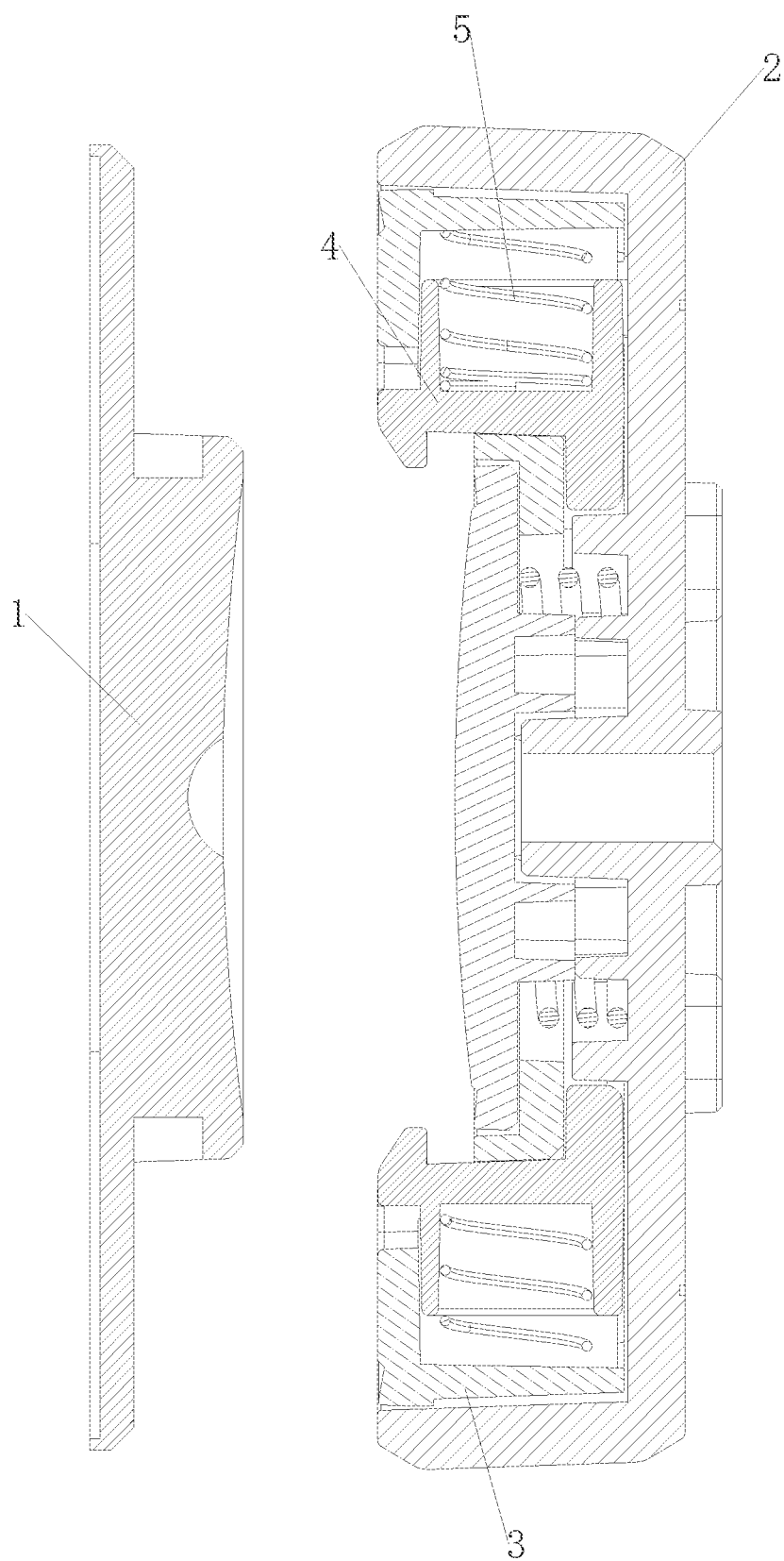
FIG. 14 shows a diagram of the open state.
Figure 15:
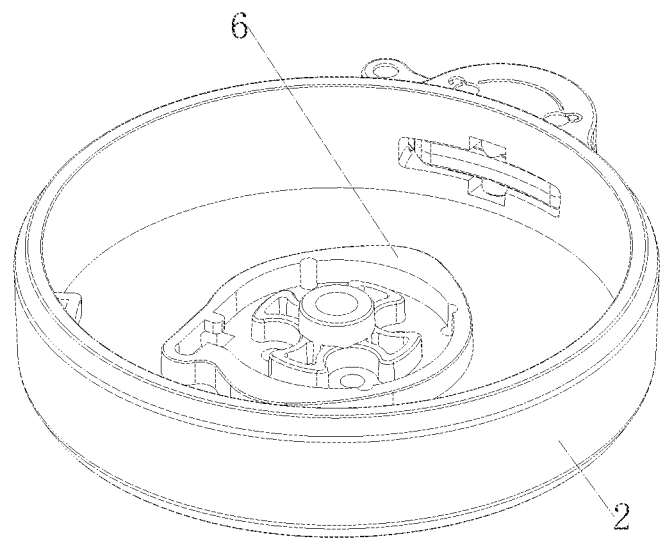
FIG. 15 shows the three-dimensional diagram of the shell.
Figure 16:
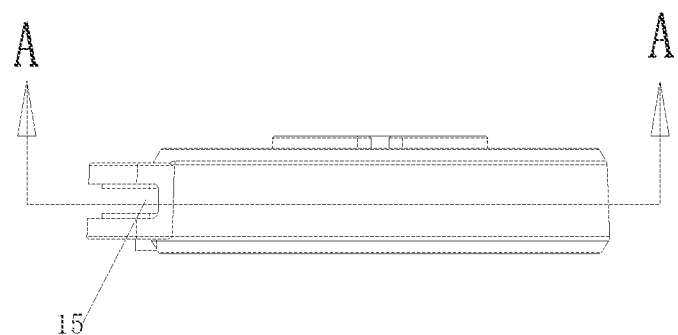
FIG. 16 shows the side view of the shell.
Figure 17:
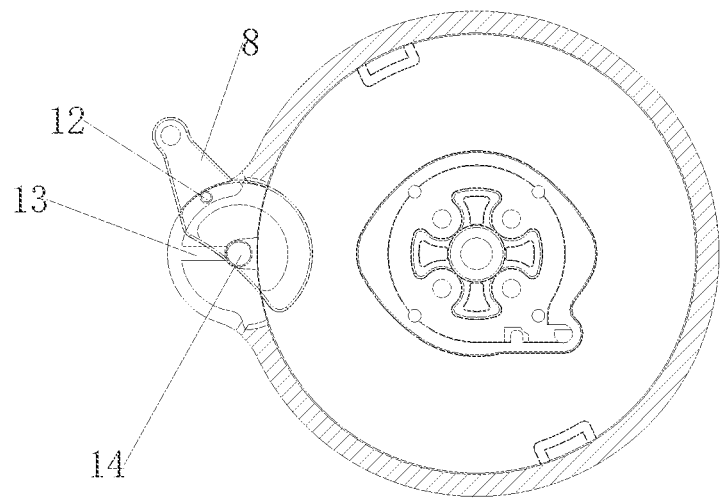
FIG. 17 shows A-A section view of FIG. 16.
Figure 18:
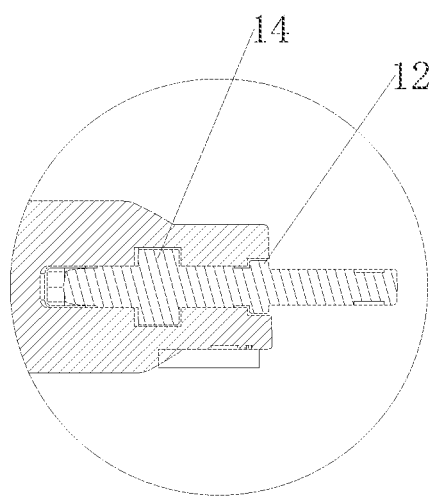
FIG. 18 shows a partial magnification of FIG. 17.
Reference Numerals: 1, mobile phone patch; 2, shell; 3, rotating wheel; 4, buckle; 5, buckle spring; 6, cam; 7, rotating return spring; 8, locking wrench; 9, locking groove; 10, double side tape; 11, mounting screw hole; 12, limit shaft; 13, guide groove; 14, rotating centre shaft; 15, mounting groove.

Preferably, the bottom of the shell 2 is provided with a mounting screw hole 11. In this way, it is easy to be connected with other components so as to be combined into a variety of different functions of products with a wide range of use, and can avoid modelling serval times for similar products, however, only needs to design connectors so that development cost is reduced, modular products has a unified standard, and the performance becomes more stable. For example, when installing, the mobile phone patch 1 is stuck to the back of the phone through a double side tape 10, the shell 2 is provided onto an object being installed through a mounting screw hole 11 on its bottom with a screw, so that the disclosure is formed into an arm clip shown in FIG. 3, a belt clip shown in FIG. 3b, and a bicycle clip shown in FIG. 3c. Due to the split design of patch and buckle module, it only needs to stick the patch on digital products (e.g. mobile phones, cameras, speakers, etc.) by glue, you can connect digital products with buckle module. The patch and buckle module are regardless of the direction, and can be installed horizontally or vertically.

When it is necessary to secure the mobile phone, an end of the mobile phone patch 1 is inserted into the buckle cavity of the rotating wheel 3, at this time the rotating wheel 3 is in the first angle range, the minimum part of the cam 6 corresponds to the position of the buckle 4, therefore, the buckle spring 5 drives the buckle 4 inward to buckle the mobile phone patch 1. If the mobile phone needs to be removed, then the rotating wheel 3 is turned so that the maximum part of the cam 6 corresponds to the position of the buckle 4, thus the cam 6 pushes the buckle 4 outward to unlock the clamping between the buckle 4 and the mobile phone patch 1.

As a result of the adoption of the above-mentioned technical solution, the disclosure can be easily installed and disassembled the mobile phone with one hand, and solve the problem of the trouble of installing the mobile phone, unstable buckles, and inconvenient removal with one hand. The rotation of this disclosure is also the process of disassembling the mobile phone, so as to avoid that the products in the prior art need to press at first and then operate with two hands.

Preferably, the digital product fixing device further includes a rotating return spring 7, an end of the rotating return spring 7 is connected with the shell 2, and another end of the rotating return spring 7 is connected with the rotating wheel 3. When the mobile phone is removed, the rotating wheel automatically will return to the closed state through the return of the rotating return spring 7 without manual adjustment. Specifically, turn the mobile phone with the patch so as to rotate the rotating wheel. When the angle of rotation reaches 90 degrees, the buckle is pushed out to open state through the high point of the cam of the shell, the patch is unlocked with the alloy buckle, and then the mobile phone is removed. When the rotating wheel is not affected by forces, the rotating return spring will drive the rotating wheel to turn 90 degrees in reverse, at this time, the alloy buckle reaches the low point of the cam of the shell, and the buckle spring pushes the buckle out to the close state.

Preferably, the first angle range is 0-70 degrees, and the second angle range is 80-90 degrees. When using, turn the mobile phone with the patch with one hand to rotate the rotating wheel. When the angle of rotation is beyond 90 degrees, the alloy buckle retracts to the open position, the patch is detached from the alloy buckle, and the mobile phone is removed. The maximum rotation angle of the rotating wheel in the buckle module is 90 degrees, wherein, 0-70 degrees is the close state, 70-80 degrees is the transition zone, and 80-90 degrees is the open state. Therefore, when the mobile phone is turned carelessly within 70 degrees of the rotation angle, the mobile phone is still safe and stable, will not fall off.

Preferably, the digital product fixing device further includes a locking wrench 8, a locking groove 9 matching with the locking wrench 8 is provided on the rotating wheel 3, the locking wrench 8 is pivotably connected with the shell 2. In this way, a rotating locking structure can be formed by the locking wrench 8 so as to prevent the detaching of the patch caused by the carelessly and unartificial rotation of the mobile phone. For example, turn the locking wrench with 120 degrees, and then the cam of the locking wrench enters the locking groove 9 of the rotating wheel; after being matched well with each other, the rotating wheel cannot turn. The rotating locking structure is a concentric shaft stir structure, which is formed by the coupling between a cam and a concave wheel. The design is reliable, and the assembly is simple.

Preferably, the shell 2 is provided with a mounting groove 15 for inserting the locking wrench 8, the locking wrench 8 is provided with a rotating centre shaft 14 and a limit shaft 12, and the middle of the mounting groove 15 is provided with a guide groove 13 for passing the limit shaft 12. When installing, insert the rotating wrench from a side inside the product into the mounting groove 15 mounted the shell, and slide the limit shaft 12 towards the guide groove 13 and push the limit shaft 12 into the bottom. Then, make the rotating centre shaft 14 is concentric with the concave platform position of the shell, and then you can use it normally. In this way, when a protrusion of the rotating centre shaft is matched with the concave platform position of the shell, the rotating centre shaft can be hidden inside and is not visible from the product appearance, so a simple appearance can be achieved. In addition, a protrusion of the limit shaft and a concave platform of the shell could prevent the rotating wrench moving inward, the rotating wrench is fixed on the shell through the coupling between the rotating centre shaft and the limit shaft.

The embodiments described above represent only a few embodiments of the disclosure, its description is more specific and detailed, but cannot be understood as a limitation on the scope of the patent of the disclosure. It should be pointed out that for ordinary technical personnel in the art, without departing from the concept of the disclosure, you can also make a number of deformations and improvements, these are the scope of protection of the disclosure. Therefore, the scope of protection of the patent of the disclosure shall be subject to the attached claim.

I claim:

1. A digital product fixing device comprising:
   a mobile phone patch;
   a shell, comprising a mounting cavity;
   a rotating wheel, pivotally arranged in the mounting cavity of the shell;
   a buckle, comprising a buckle cavity; and
   a buckle spring, wherein the buckle is retractably arranged along a radius of the rotating wheel through the buckle spring; and
   a cam, which is arranged on and protrudes from a bottom surface of the mounting cavity of the shell; wherein one end of the mobile phone patch is configured to be inserted into the buckle cavity of the rotating wheel, and wherein the cam is operative to cause the buckle spring to push the buckle spring inward to buckle up the mobile phone patch in response to the rotating wheel turning into a first angular range, and operative to push the buckle outward so as to unlock the clamping between the buckle and the mobile phone patch in response to the rotating wheel turning into a second angular range;
   wherein the digital product fixing device further comprises a locking wrench, and a locking groove matching with the locking wrench that is defined in the rotating wheel, and wherein the locking wrench is pivotably connected with the shell.

2. The digital product fixing device according to claim 1, further comprising a rotating return spring, wherein an end of the rotating return spring is connected with the shell, and another end of the rotating return spring is connected with the rotating wheel.

3. The digital product fixing device according to claim 1, wherein the first angular range is 0-70 degrees, and the second angular range is 80-90 degrees.

4. The digital product fixing device according to claim 1, wherein the bottom of the shell defines a mounting screw hole.

5. The digital product fixing device according to claim 1, wherein the shell is provided with a mounting groove for inserting the locking wrench, the locking wrench is provided with a rotating centre shaft and a limit shaft, and the middle of the mounting groove is provided with a guide groove for passing the limit shaft.

\* \* \* \* \*